(12) United States Patent
Boice et al.

(10) Patent No.: US 7,497,302 B2
(45) Date of Patent: Mar. 3, 2009

(54) ADJUSTABLE TENSILE MEMBER FOR A CLIMBING STAND

(76) Inventors: Curtis Jason Boice, 28 Comanche Ct., Palm Coast, FL (US) 32137; Timothy Scott Skipper, 1 Windsail Cir., Ormond Beach, FL (US) 32174

( * ) Notice: Subject to any disclaimer, the term of this patent is extended or adjusted under 35 U.S.C. 154(b) by 463 days.

(21) Appl. No.: 10/980,048

(22) Filed: Nov. 3, 2004

(65) Prior Publication Data

US 2005/0269157 A1  Dec. 8, 2005

Related U.S. Application Data (60) Provisional application No. 60/578,181, filed on Jun. 8, 2004.

(51) Int. Cl.
A63B 27/00 (2006.01)
(52) U.S. Cl. .................. 182/136; 182/187; 182/188
(58) Field of Classification Search ......... 182/133–136, 182/187, 188, 116, 113, 20, 204; 108/152; 297/217.7
See application file for complete search history.

(56) References Cited

U.S. PATENT DOCUMENTS

| | | | |
|---|---|---|---|
| 3,833,090 A | 9/1974 | Georgianna | |
| 3,937,298 A * | 2/1976 | Hurwitz | 182/204 |
| 4,450,936 A | 5/1984 | Strom | |
| 4,597,473 A * | 7/1986 | Peck | 182/187 |
| 4,953,662 A | 9/1990 | Porter | |
| 5,097,925 A | 3/1992 | Walker, Jr. | |
| 5,234,076 A | 8/1993 | Louk et al. | |
| 5,588,499 A | 12/1996 | Carriere | |
| 5,680,910 A * | 10/1997 | Sarphie, IV | 182/135 |
| 5,862,883 A | 1/1999 | Carriere | |
| 5,975,242 A | 11/1999 | Woller et al. | |
| 6,182,792 B1 | 2/2001 | Woller et al. | |
| 6,247,553 B1 | 6/2001 | Jones | |
| 6,264,000 B1 | 7/2001 | Johnson | |
| 6,269,906 B1 | 8/2001 | Dockter et al. | |
| 6,308,801 B1 * | 10/2001 | Futch | 182/136 |
| 6,397,973 B1 | 6/2002 | Woller | |
| 6,481,529 B1 | 11/2002 | Voorhies | |
| 6,523,642 B1 | 2/2003 | Graham, Jr. et al. | |
| 6,622,823 B2 | 9/2003 | Engstrom | |
| 6,668,976 B2 | 12/2003 | Graham, Jr. et al. | |
| 6,698,549 B2 | 3/2004 | Graham, Jr. et al. | |
| 2005/0082730 A1 * | 4/2005 | Murray et al. | 269/166 |

* cited by examiner

*Primary Examiner*—Richard E. Chilcot, Jr.
*Assistant Examiner*—Matthew J Smith
(74) *Attorney, Agent, or Firm*—J. Wiley Horton (57) ABSTRACT

A climbing tree stand having a continuous length adjustment for the tensile member passing around the tree. FIG. 1 shows the stand, incorporating a foot platform and a seat platform. Each platform is bound to the tree by a flexible tensile member. Each tensile member is removably connected to a first and second slider. Each slider rides along a bar. The slider is ordinarily clamped firmly to the bar. It can only be moved by the user pressing a lock plate and sliding it along. Thus, the tensile member can be adjusted without ever releasing it from the platform. In addition, if the user should accidentally release his or her grip on the slider, the slider will lock itself in position and prevent the platform dislodging.

15 Claims, 14 Drawing Sheets

ADJUSTABLE TENSILE MEMBER FOR A CLIMBING STAND

CROSS-REFERENCES TO RELATED APPLICATIONS

This application is a non-provisional application claiming the benefit, pursuant to 37 C.F.R. §1.53 (c), of an earlier filed provisional application. The provisional application listed the same inventors. It was filed on Jun. 8, 2004 and assigned Ser. No. 60/578,181.

STATEMENT REGARDING FEDERALLY SPONSORED RESEARCH OR DEVELOPMENT

Not Applicable

MICROFICHE APPENDIX

Not Applicable

BACKGROUND OF THE INVENTION

1. Field of the Invention

This invention relates to the field of tree stands. More specifically, the invention comprises a tree stand having a continuously adjustable tensile member for passing around a tree and attaching the stand thereto.

2. Description of the Related Art

The prior art contains numerous examples of climbing tree stands. These devices incorporate two major assemblies. The first assembly incorporates a foot rest and the second incorporates a seat of some type. U.S. Pat. Nos. 5,975,342; 6,182,792; and 6,397,873 to Woller et.al. show typical examples.

Figure 1:
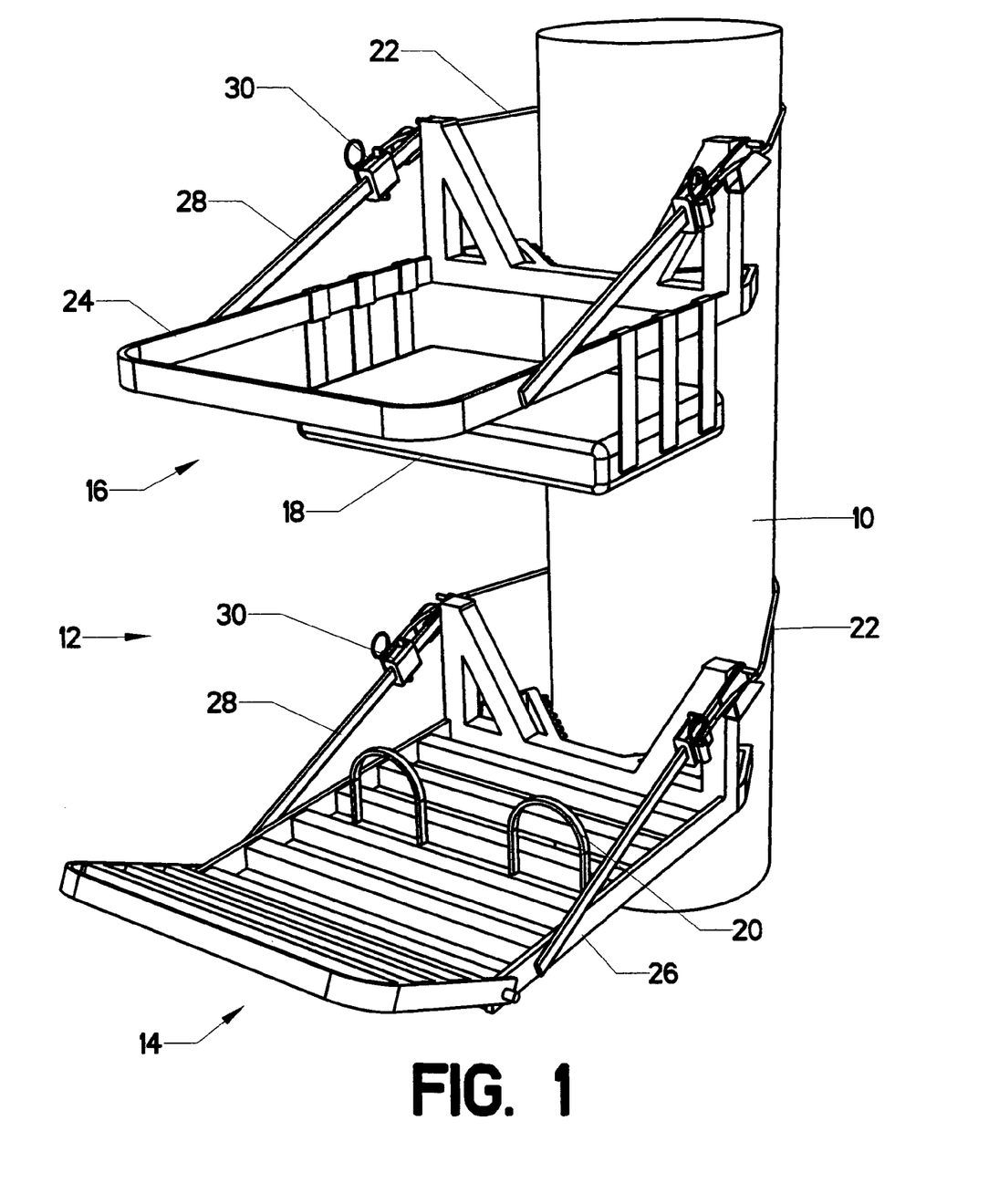
FIG. 1 is a perspective view, showing all the components of the present invention.

FIG. 1 of the present disclosure shows the two major assemblies, denoted as seat platform 16 and foot platform 14. Both platforms incorporate some type of flexible tensile member 22 passing around tree 10.

Those skilled in the art will understand the conventional operation of such devices. When weight is placed on either platform, the combination of the tensile member and the standoffs built into the treeward-facing side of the platforms will bind the platform to the tree. If an upward force is placed on the platform, however, it can slide up the tree.

The user typically faces the tree while climbing. The user stands on the foot platform and hooks his or her feet into toe loops 20. Seat 18 is stowed out of the way so that the user's torso rests inside seat frame 24. The user braces against the seat platform and lifts his or her feet upward to raise foot platform 14. When weight is placed back on the foot platform, it locks again to the tree. The user then raises seat platform 16. This cycle is repeated, so that the user crawls up the tree caterpillar-style.

The reader will appreciate that the length of tensile member 22 is critical to the proper adjustment of the two platforms. If it is too long, the platforms will be pitched downward. If it is too short, the platforms will be pitched upward. Thus, the length is ideally made adjustable. The aforementioned Woller patents include such adjustment features.

The user must typically adjust the length of the tensile member during the initial installation of the platforms at the base of the tree. Such tensile members are generally not adjustable while the platforms are in use (Manufacturers actually discourage such adjustment, since it is inherently unsafe). Of course, tree trunks often taper as one proceeds upward. Thus, the experienced user will set the length too short for the diameter found at the base of the tree. The platforms will therefore initially be pitched upward. As the user climbs, though, the pitch will transition to the desired horizontal orientation.

The reader will appreciate that even the experienced user will often misjudge a tree's diameter 15 to 20 feet off the ground. In this case, the stand must be readjusted. While the prior art devices allow such adjustment, it cannot be done easily. The user must descend the tree, readjust the stand, then climb back to the original position. This necessity results from the fact that the prior art devices require the tensile member to be disconnected during the adjustment, making it unsafe while off the ground. Thus, it is desirable to have a climbing tree stand in which the length of the tensile member can be easily adjusted without having to disconnect it from the platform.

BRIEF SUMMARY OF THE INVENTION

The present invention comprises a climbing tree stand having a continuous length adjustment for the tensile member passing around the tree. FIG. 1 shows the stand, incorporating a foot platform and a seat platform. Each platform is bound to the tree by a flexible tensile member. Each tensile member is removably connected to a first and second slider. Each slider rides along a bar. The slider is ordinarily clamped firmly to the bar. It can only be moved by the user pressing a lock plate and sliding it along. Thus, the tensile member can be adjusted without ever releasing it from the platform. In addition, if the user should accidentally release his or her grip on the slider, the slider will lock itself in position and prevent the platform dislodging.

REFERENCE NUMERALS IN THE DRAWINGS 10 tree
12 climbing stand
14 foot platform 16 seat platform
18 seat
20 toe loop
22 tensile member
24 seat frame
26 foot frame
28 bar
30 slider
32 vee brace
34 upright
36 guide channel
38 boss
40 pin receiver
41 lock plate
42 slot
44 spring
46 bearing point
48 jacket
50 core
52 termination
54 pin
56 ring
58 lock member
60 access slot
62 outside wall
64 lock plate opening
66 angled pin
68 through hole
70 supplemental lock
72 safety pin
74 actuation surface
76 engagement surface
78 spring ring

DETAILED DESCRIPTION OF THE INVENTION

FIG. 1 shows a climbing stand 12 attached to tree 10. The climbing stand is comprised of two separate assembles—seat platform 16 and foot platform 14. Both the seat and foot platforms include many conventional features. The novel aspects of the present invention reside in the attachment to the tree. However, in order to fully explain the context of the invention, a general description of the conventional features may be helpful.

Seat platform 16 includes seat frame 24. A removable seat 18 is suspended from the seat frame. The treeward-facing side includes a brace configured to bear against the tree (described in more detail subsequently). A tensile member 22 loops around the tree. Each end of the tensile member is secured to the seat platform. The left end is secured to a slider 30. The right end is secured to a second slider. Both sliders are able to be adjusted back and forth on a bar 28, which is provided on either side of the frame. Other supporting features for the tensile member and sliders will be described in more detail subsequently.

The reader will observe that foot platform 14 shares the same features for mounting its own tensile member. Foot frame 26 is generally similar to seat frame 24. Its structure is a bit different, however, in that it has a number of cross bars to support the user's feet, an adjustable toe board, and a pair of toe loops. However, the novel aspects are the same for the seat platform and the foot platform. Thus, for the remainder of this disclosure, the seat platform will be discussed in detail, with the reader understanding that the same features are found on the foot platform.

Figure 2:
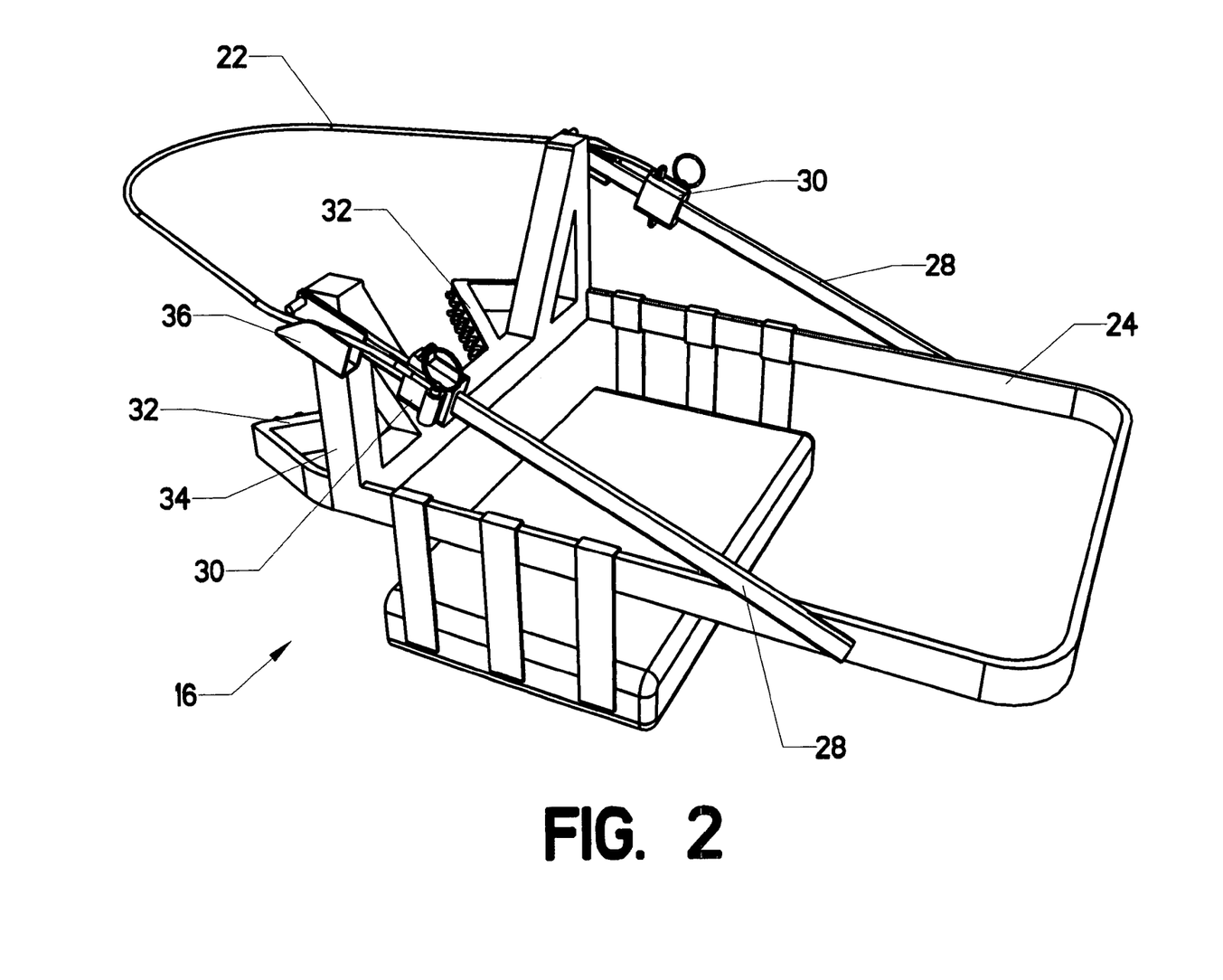
FIG. 2 is a perspective view, showing details of the seat platform.

FIG. 2 shows seat platform 16 standing alone. The treeward facing brace forms the shape of a "vee." It is denoted as vee brace 32 in the view. It preferably incorporates serrations to facilitate gripping of the tree trunk. Tensile member 22 is positioned to wrap around the tree trunk. It must be flexible, yet fairly stiff so that it does not snag when it is moved up the tree trunk. Plastic-coated wire rope is a good material for this application, as is a metal chain housed within a rubber sleeve.

The length of the tensile member must be properly adjusted in order for the platform to be safely locked to the tree. The attachment of at least one end of the tensile member to the platform must be made adjustable. Preferably, the attachment at both ends is made adjustable. The reader will observe that each end of the tensile member shown in the view is attached to a slider 30. Each slider 30 can be adjustably positioned along a bar 28.

The two bars 28 are attached to the seat frame by uprights 34 and associated braces. The tensile member is also passed through a guide channel 36 (one on either side). The guide channel is not strictly necessary to the operation of the present invention, but it does provide a significant safety enhancement. It also guides the ends of the tensile member into an appropriate position for reattachment to the sliders.

Figure 3:
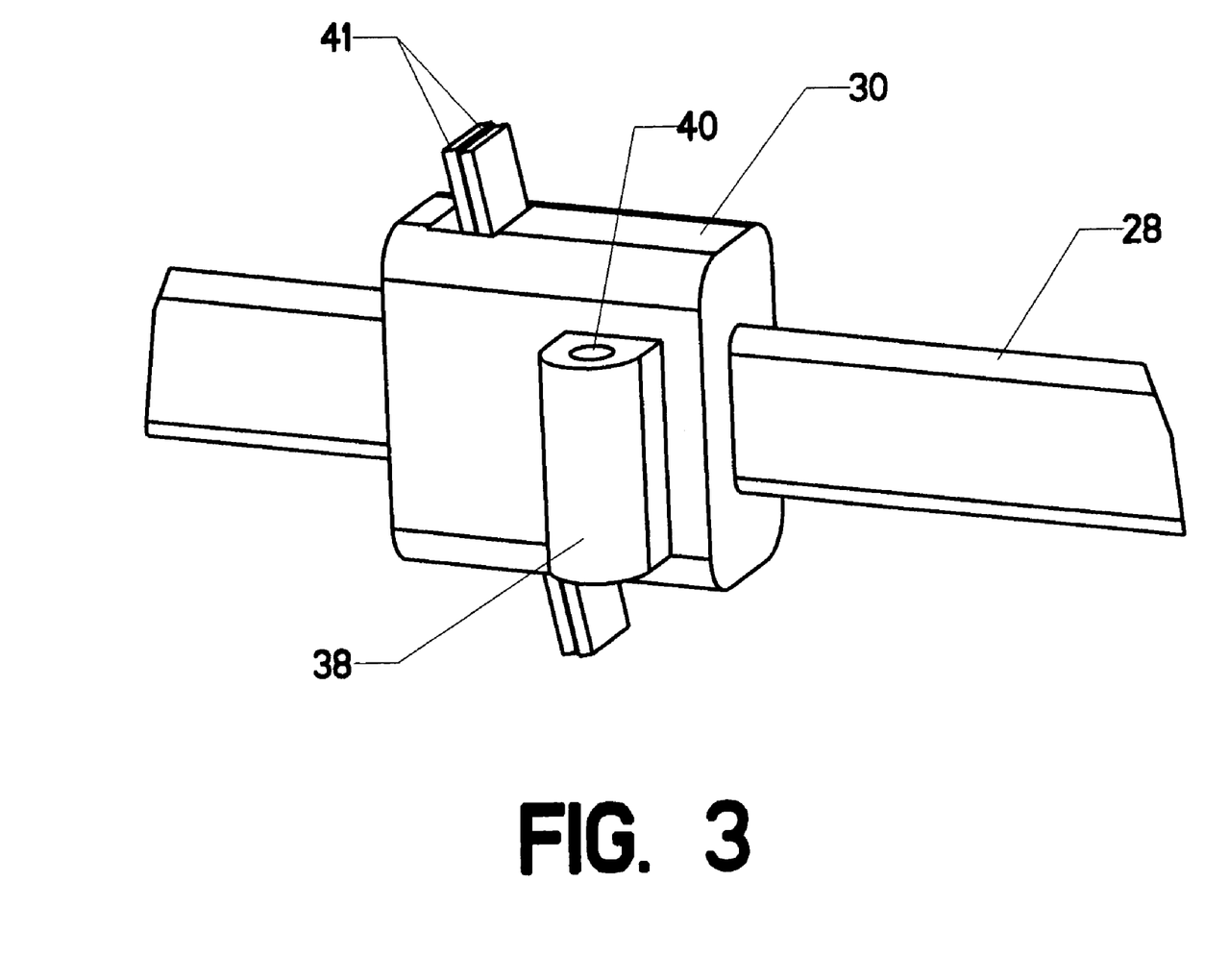
FIG. 3 is a detail view, showing a slider and a bar.

FIG. 3 shows a slider 30 in more detail. It includes boss 38, which opens into pin receiver 40. The pin receiver is sized to receive a pin on the tensile member, thereby attaching the tensile member to the slider. The slider can be moved along bar 28 and locked in any desired position. Those skilled in the art will know that numerous mechanisms could be employed to achieve this operation. One particularly suitable mechanism is similar to one found in woodworking clamps and caulking guns.

Figure 4:
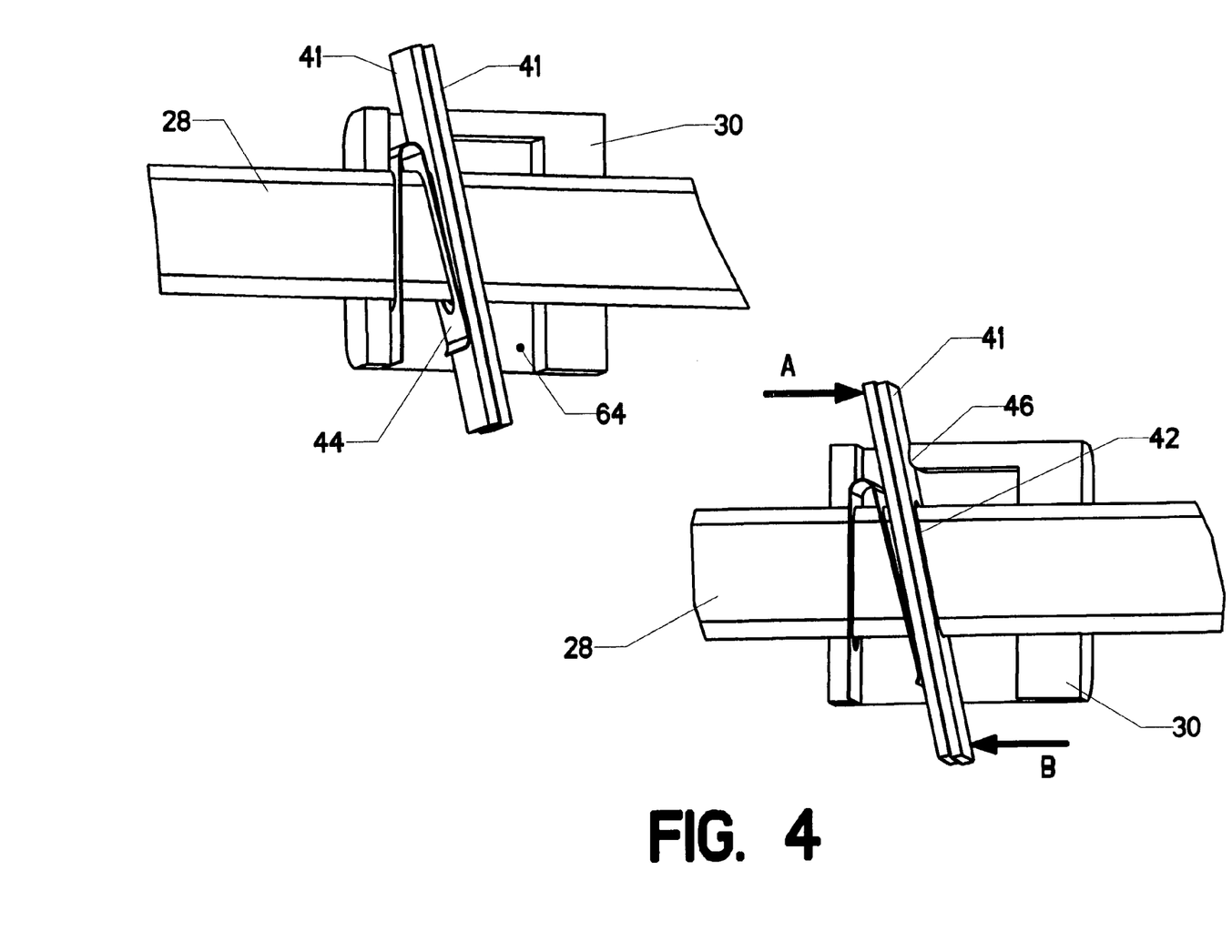
FIG. 4 is a detail sectional view, showing the interaction of a slider and a bar.

FIG. 4 shows the internal details of this mechanism, with the slider itself being sectioned in half. In the lower view, the reader will observe that lock plates 41 are mounted on bar 28 by sliding a slot 42 found in each lock plate over the bar. The lock plates are biased to pivot in the counterclockwise direction (with respect to the orientation shown in the view) by the action of spring 44. The upper portion of the lock plates is therefore pressed against bearing point 46 on the slider's internal surfaces.

The upper view in FIG. 4 shows spring 44 more clearly (Note that the spring has a slot allowing it to slide over bar 28 and still flex). Lock plate opening 64 passes through the slider from top to bottom, allowing a portion of each lock plate to pass out the top and bottom of the slider, where it can be actuated by the user.

In studying the lower view in FIG. 4, those skilled in the art will readily appreciate the following: If one grasps the slider and attempts to pull it to the left, the lock plates will jam against the bar and the slider will be locked in place. If one grasps the slider and attempts to pull it to the right, the lock plates will slide along the bar and allow the slider to move.

Still studying the same view, the reader will also realize that if the user presses on the lock plates at point B in the direction indicated by the arrow, the assembly will unlatch and slide toward the left. Likewise, if the user presses on the lock plates at point A in the direction indicated by the arrow, the assembly will slide to the right (Of course, as mentioned previously, the user need not press at point A. The user can grasp the slider anywhere and slide it to the right).

In operation, the tensile member will be passed around the tree and attached to the sliders. The user then grasps one of the sliders and slides it away from the tree (The reader will recall that it slides freely in this direction) until the slack is taken up. The reader can then begin climbing the tree. Because the tree trunk usually tapers as the user climbs, additional slack will likely develop. The user removes this slack by grasping one of the sliders and sliding it further away from the tree.

Returning now to FIG. 2, the user will understand the operation of the sliders and the tensile member. The tensile member—when loaded—will tend to force the two sliders to the left in the view. The sliders will therefore lock to the bars and hold in position. It is not generally possible to move the sliders while the tensile member is in position. Thus, the user cannot accidentally release the sliders while the tensile member is under load.

If the user wishes to add slack to the tensile member, he or she must first unload the tensile member, then press the exposed lower portion of the lock plates to the left (direction B in FIG. 4). If the user wishes to remove slack from the tensile member, he or she can simply grab the slider and pull it to the right or press the exposed upper portion of the lock plates and push toward the right (direction A in FIG. 4). The user can choose to adjust one or both of the sliders, depending on how much adjustment is needed. Moving the sliders will increase or decrease the available length of the tensile member.

Figure 5:
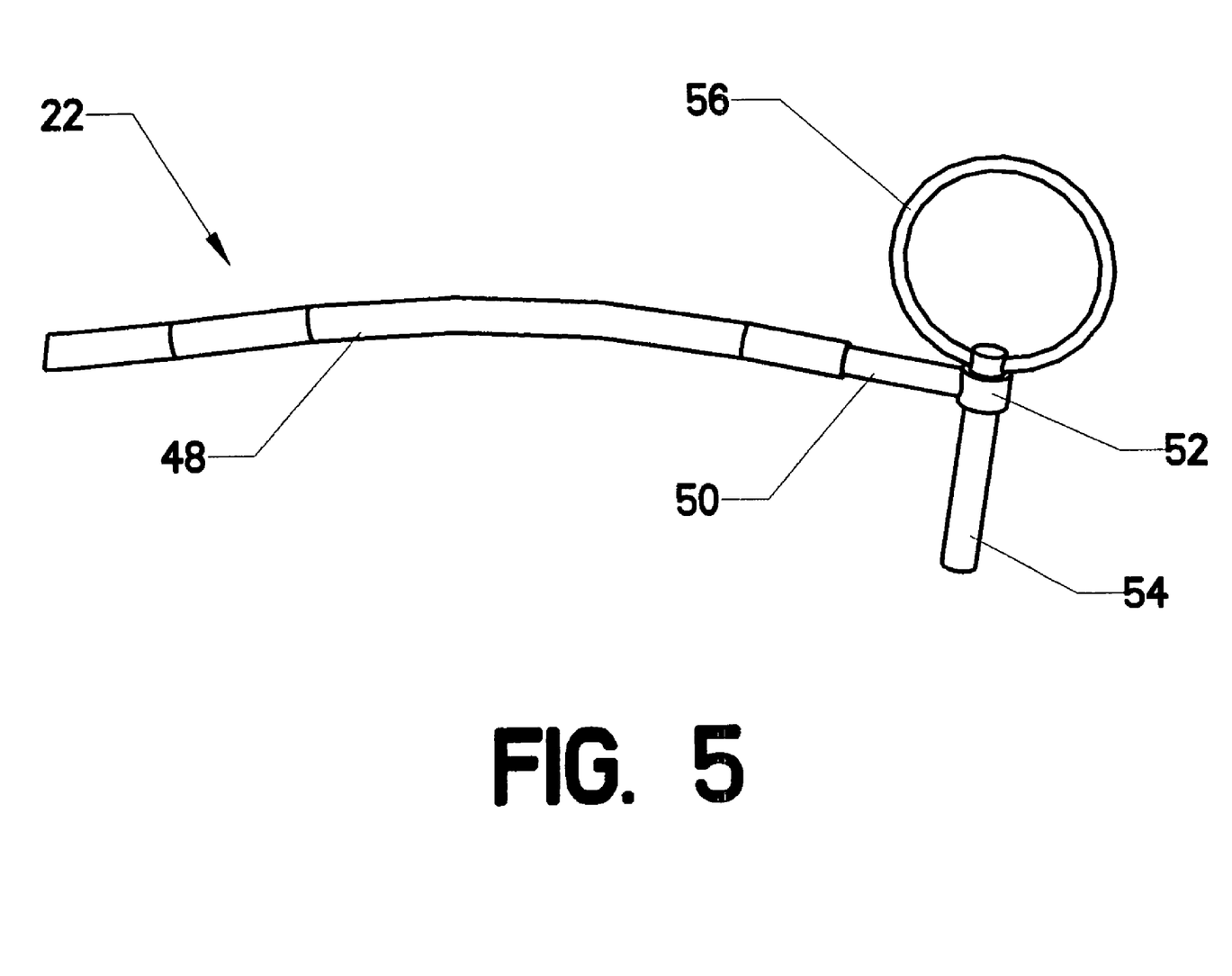
FIG. 5 is a detail view, showing an end of a tensile member.

FIG. 5 shows a detail view of one end of tensile member 22. The tensile member in this example is composed of a core 50 (typically braided wire rope) encapsulated by a jacket 48. Termination 52 is formed on the end of the core, typically by swaging or casting. A pin 54 extends downward from this termination. Ring 56 is provided to facilitate gripping and removal by the user. The pin 54 is preferably welded to the end of the tensile member, so that it cannot become separated and lost. A removable pin attached by a fastener of some type could also be used.

Figure 6:
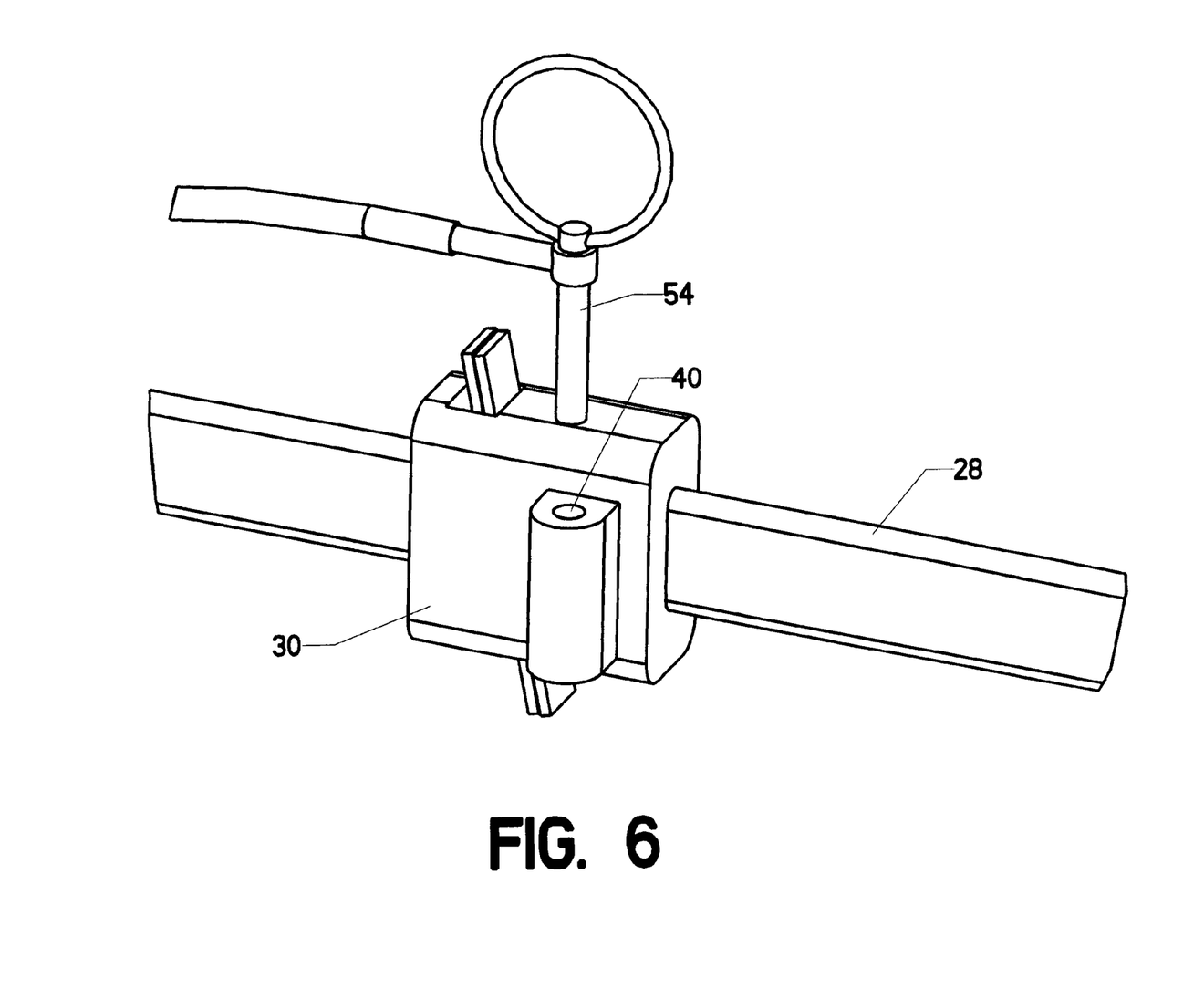
FIG. 6 is a detail view, showing the connection of a tensile member to a slider.

FIG. 6 is a detail view showing a pin 54 being pulled up and out of pin receiver 40 on the slider. This action detaches the tensile member from the slider. It is important to be able to detach the tensile member, since it must be passed around the tree trunk before it can be locked in place. However, one obviously does not wish the tensile member to become accidentally detached. A safety feature to prevent accidental detachment is therefore desirable.

Figure 7:
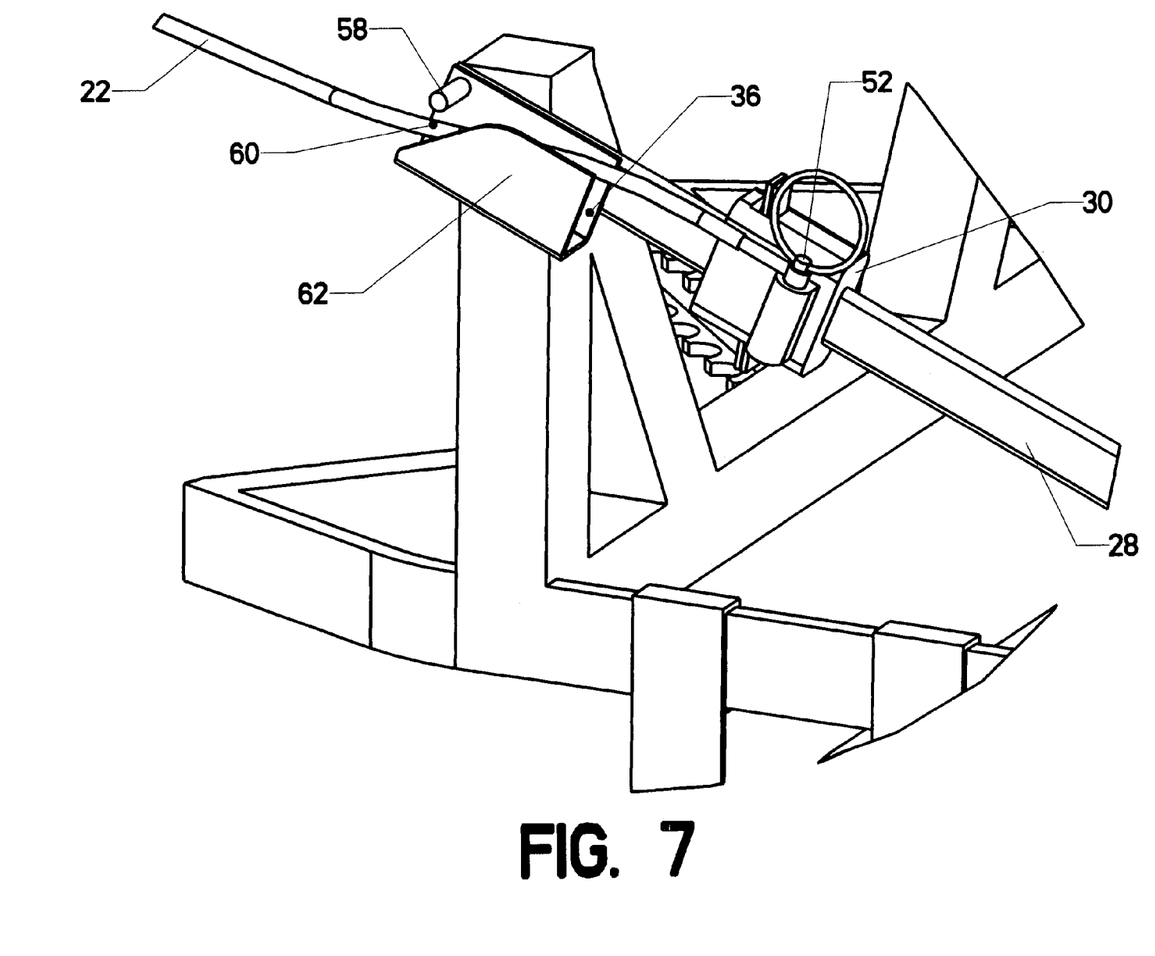
FIG. 7 is a detail view, showing the operation of a guide channel.

FIG. 7 shows such a safety feature. Each side of the platform includes a guide channel 36. A lock member 58 projects transversely across the treeward mouth of each guide channel. An angled cut is provided in outside wall 62 of each guide channel on the treeward end. The relative position of this angled cut and lock member 58 create access slot 60, which is large enough to allow the tensile member to pass. The guide channel helps guide the tensile member into the appropriate position for placing pin 54 into pin receiver 40.

In the configuration shown in FIG. 7, however, the reader will observe that lock member 58 bears down on top of tensile member 22 and holds it within guide channel 36. These components inhibit the upward motion of termination 52 and thereby secure the attachment of the tensile member to the slider.

Figure 8:
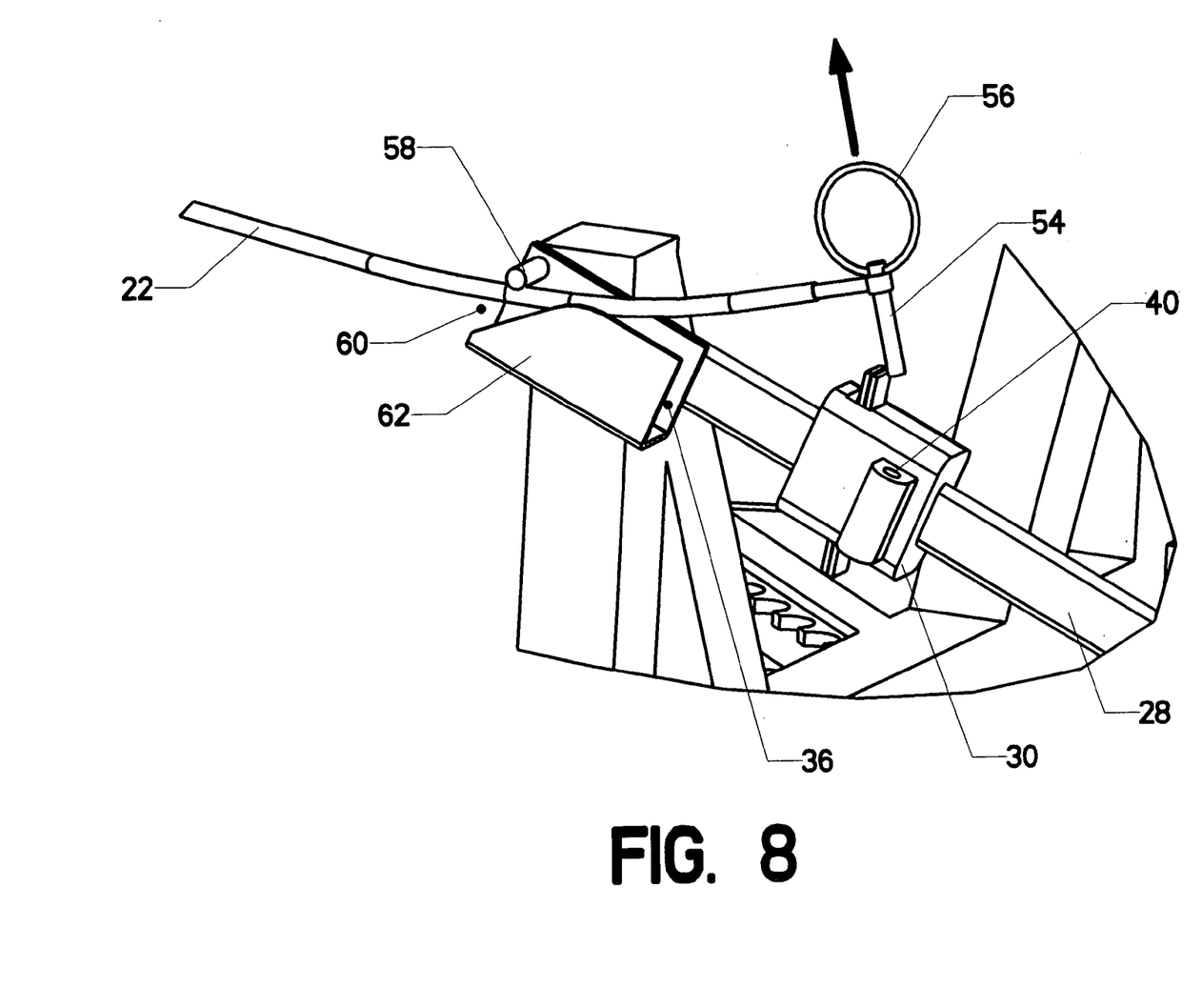
FIG. 8 is a detail view, showing the operation of a guide channel.
Figure 9:
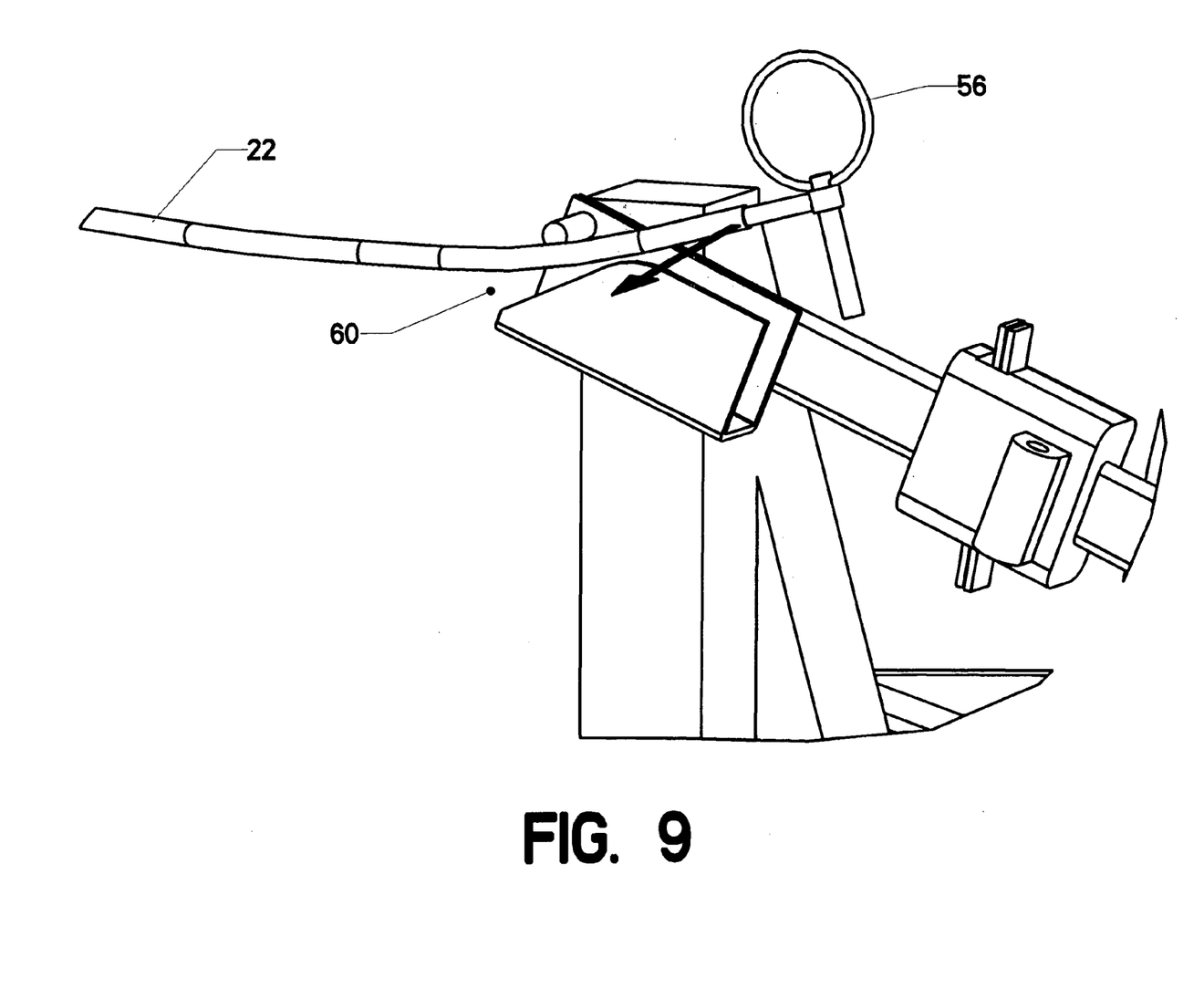
FIG. 9 is a detail view, showing the operation of a guide channel.

FIGS. 8 and 9 show the detachment operations. Once the tensile member is unloaded, it can be bent upward around lock member 58, as shown in FIG. 8. This allows the pin to be pulled free of pin receiver 40. It is only essential to make one end of the tensile member removable. In other words, only one end needs to have a pin receiver and movable pin. The other end can be permanently affixed to the slider. Of course, both ends can be made removable.

FIG. 9 shows how the tensile member can then be forced sideways to pass out through access slot 60. It is then free to be passed around the tree. The reader will appreciate, however, that accidental detachment of the tensile member is unlikely.

Figure 10:
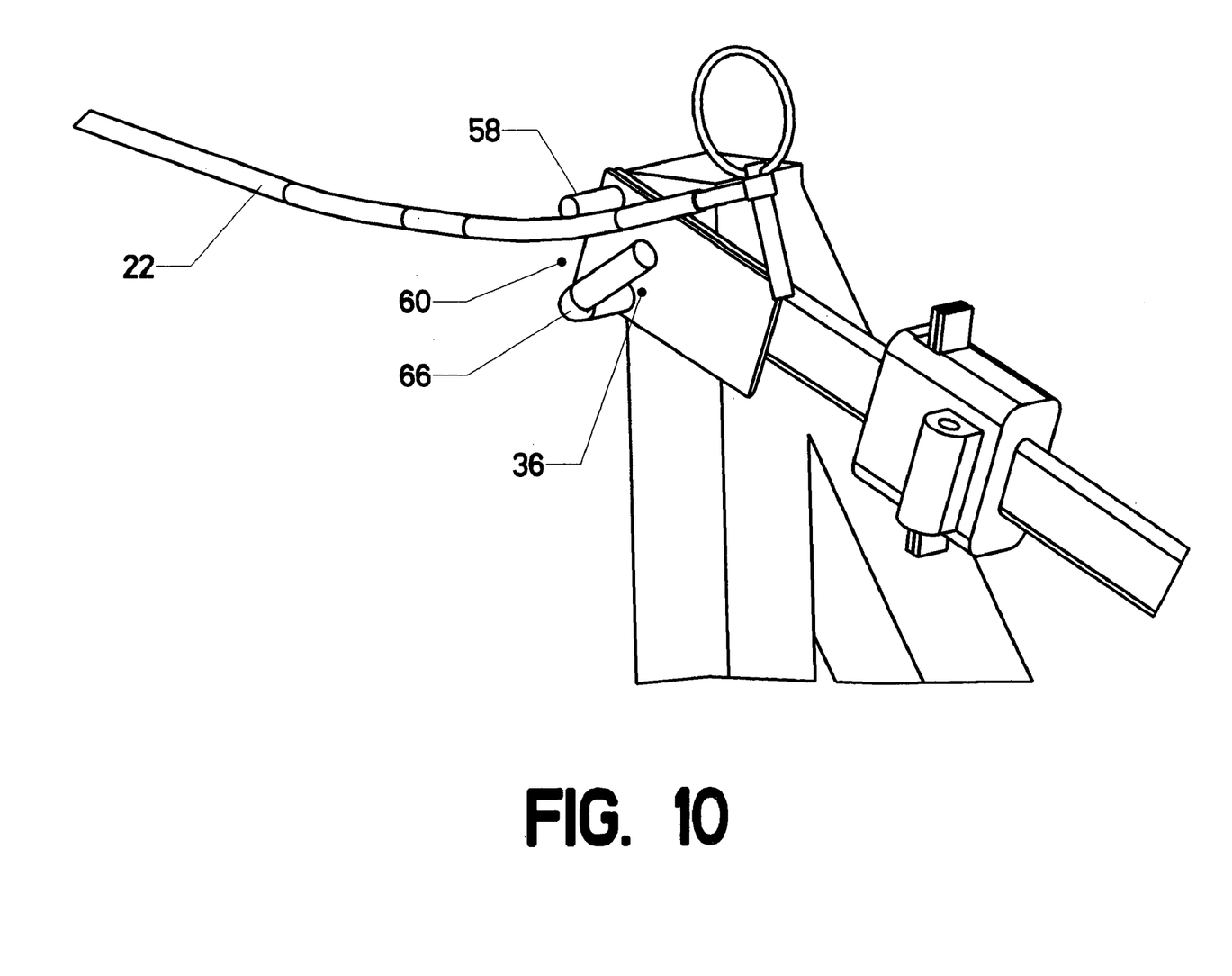
FIG. 10 is a perspective view, showing an alternate construction for the guide channel.

It is possible to simplify the manufacturing of some of the features illustrated previously. Guide channel 36—as shown in FIG. 8—is formed by attaching a piece of "C-channel" to the side of the platform. A suitable guide channel can be formed more simply. FIG. 10 shows an alternate embodiment in which guide channel 36 has been formed by attaching angled pin 66. Its operation is essentially the same, in that the tensile member must be passed through access slot 60 in order to be removed.

Figure 11:
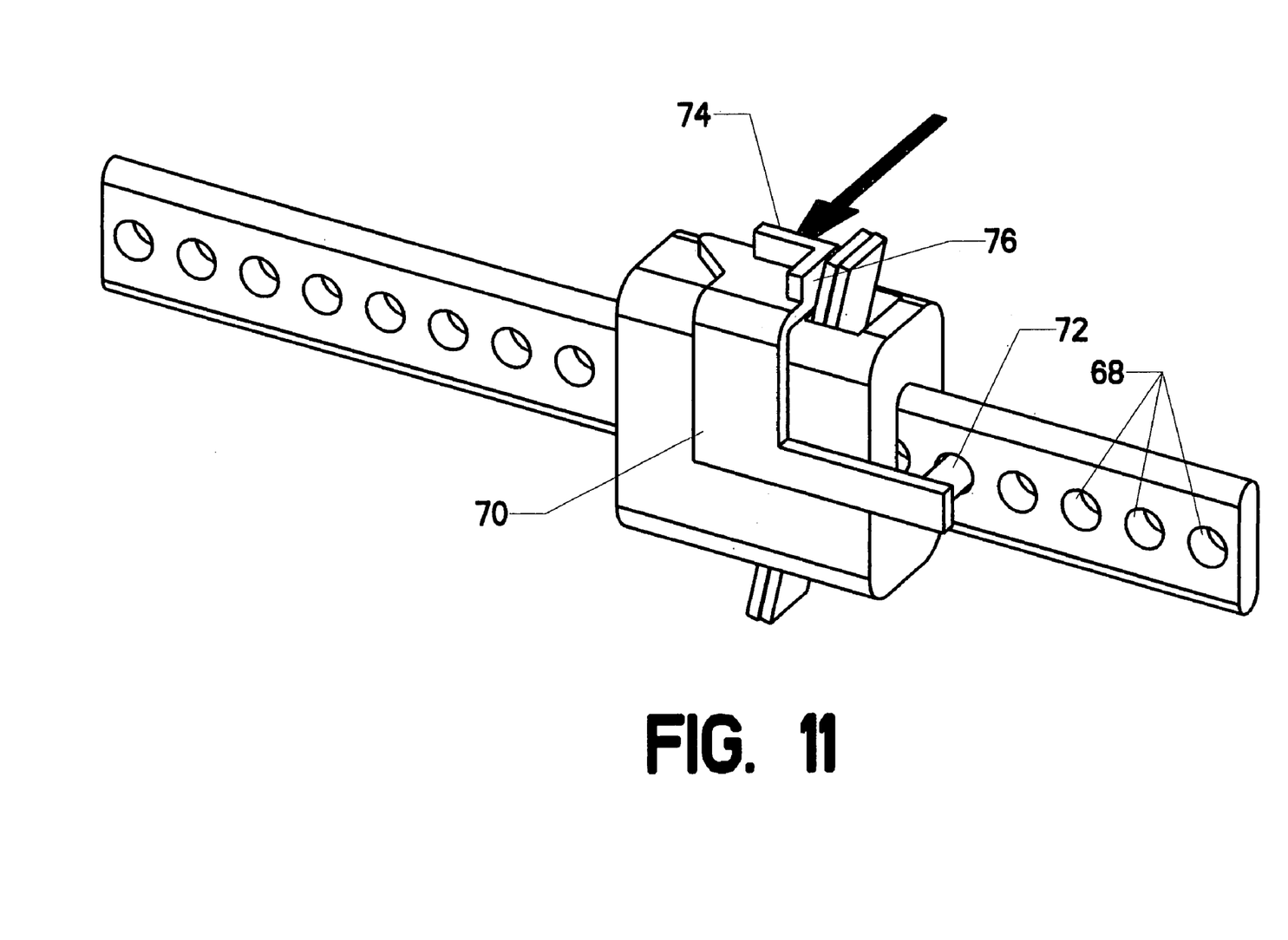
FIG. 11 is a perspective view, showing a supplemental lock.

Additional safety features are also possible. Although the one-way latching mechanism described for locking the slider to the bar can hold substantial force, some users may desire a positive mechanical interlock as an additional safety device. FIG. 11 discloses one such device. The bar has been modified by adding a series of evenly spaced through holes 68. A supplemental lock 70 has been added to the slider. It is slidably mounted to the slider, so that it can move toward the viewer in the context of the view as shown. Spring biasing means tend to keep it firmly clamped against the side of the slider (as shown). An arm extending outward mounts safety pin 72, which is locked into one of the through holes 68. In the position shown, the slider cannot move even if the one way latching mechanism fails.

Figure 12:
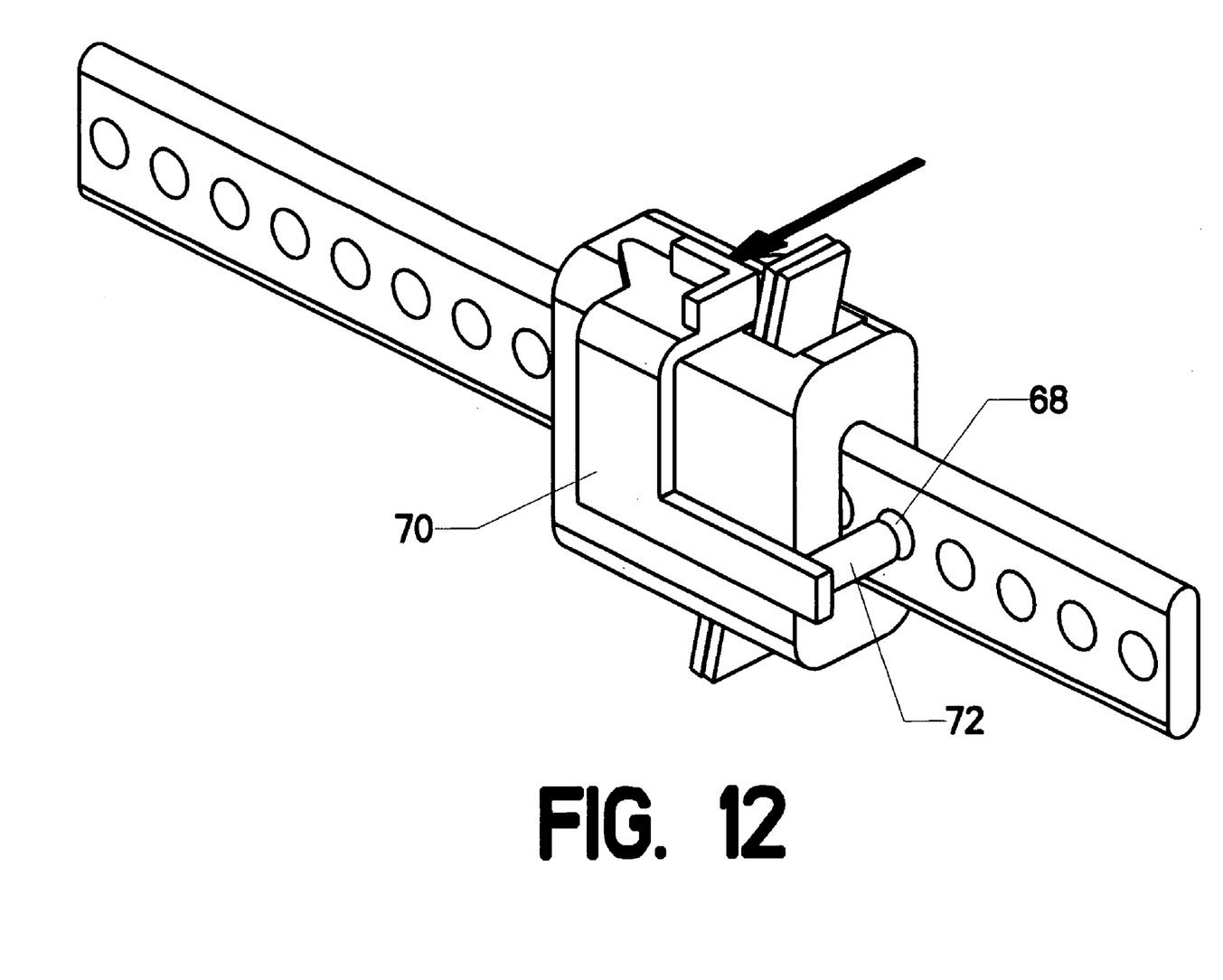
FIG. 12 is a perspective view, showing the operation of the supplemental lock.

However, if a user presses against actuation surface 74 in the direction indicated by the arrow, safety pin 72 will slide out of engagement. FIG. 12 shows supplemental lock 70 after the user has pushed it over far enough to disengage safety pin 72 from though hole 68. The supplemental lock can be configured so that as the safety pin comes free, engagement surface 76 slides out of contact with the two lock plates. This action frees the lock plates and allows the slider to move. Once the desired position is reached, the user releases pressure on actuation surface 74. The one-way latching mechanism then reengages. Safety pin 72 will also lock into one of the through-holes 68. The slider is thereby locked in position by two latching mechanisms.

Figure 13:
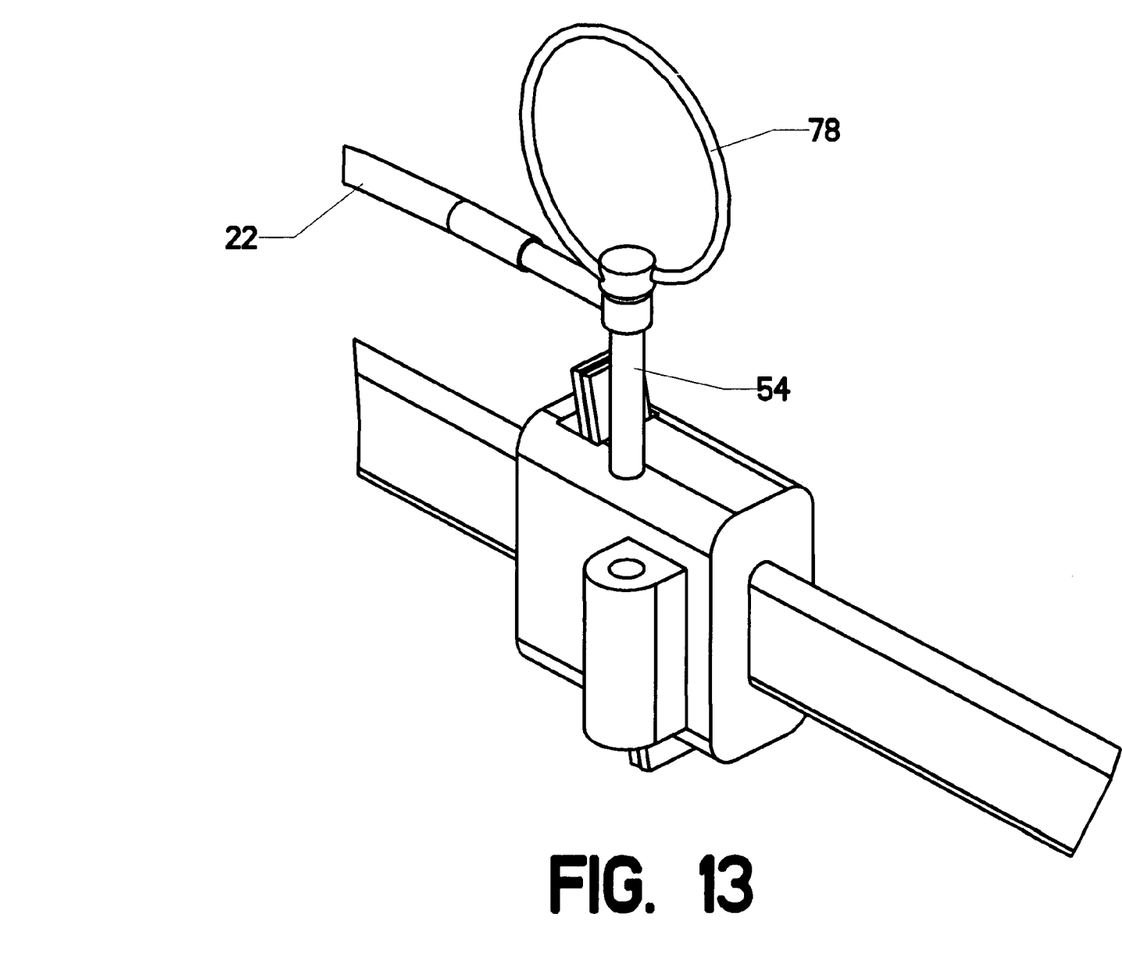
FIG. 13 is a perspective view, showing the use of a spring ring to secure the tensile member.

Another safety feature can be added to the engagement between the tensile member and the slider. FIG. 13 shows the use of a spring ring 78 on the top of pin 54. Those skilled in the art will know that a spring ring is a loop of thick wire with a helical offset. It "snaps" into two positions. The first position is snapped "up"—as shown in FIG. 13. The second position is snapped down. These types of rings are commonly used to secure pins in place when attaching agricultural implements to tractors.

Figure 14:
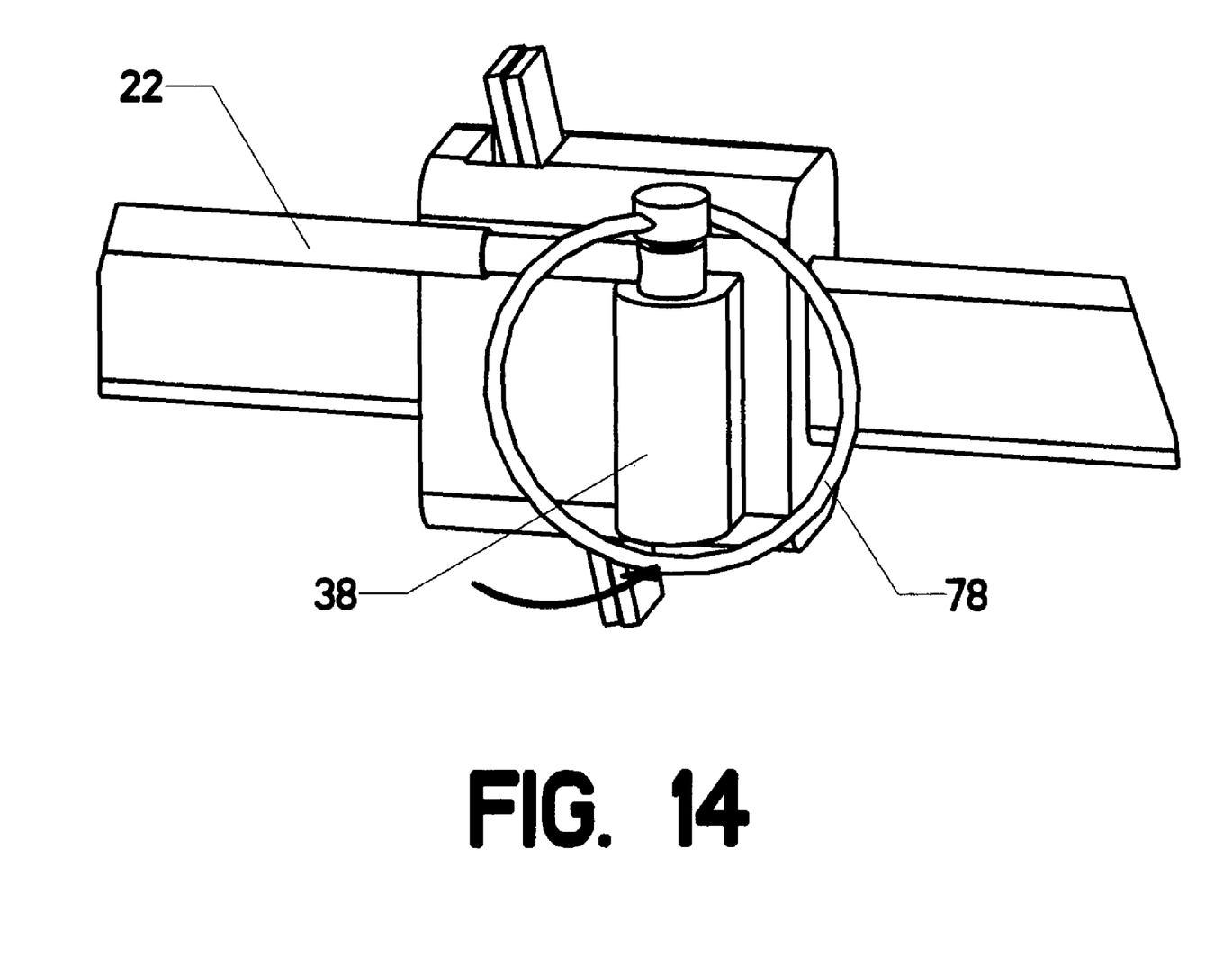
FIG. 14 is a perspective view, showing the operation of the spring ring.

In FIG. 13, spring ring 78 is snapped up out of the way. The user slides pin 54 into the pin receiver on a slider. FIG. 14 shows the pin in place. Once it is pressed down into the pin receiver, the user rotates spring ring 78 downward in the direction indicated by the arrow. The spring ring then snaps downward, so that a portion of the spring ring locks under boss 38. The helical offset in the spring ring ensures that it remains in the position shown. The pin cannot be removed until the user rotates the spring ring back to the "up" position.

Although the preceding description contains significant detail, it should not be construed as limiting the scope of the invention but rather as providing illustrations of the preferred embodiments of the invention. Thus, the scope of the invention should be fixed by the following claims, rather than by the examples given.

Having described our invention, we claim:

1. A platform which a user can attach to a tree, comprising:
   a. a frame, having a treeward-facing side;
   b. a brace, located on said treeward-facing side of said frame, configured to bear against said tree;
   c. a first slider, slidably attached to said frame;
   d. locking means for locking said first slider to said frame;

e. a flexible tensile member, having a first end and a second end, wherein said first end is attached to said first slider and said second end is attached to said frame;
f. wherein said slidable attachment between said first slider and said frame comprises said first slider sliding along a bar attached to said frame;
g. wherein said locking means comprises unidirectional locking means, whereby said unidirectional locking means is configured to lock and hold said slider to said frame when a tensile load is applied to said slider such that said slider is free to slide along said bar in a direction away from said brace, but unable to travel along said bar in the opposite direction, unless said user releases said unidirectional locking means; and
h. wherein said locking means comprises:
  (1) at least one lock plate; said at least one lock plate including a slot sized to admit said bar, wherein said slot is large enough to allow said at least one lock plate to rotate slightly with respect to said bar; said slot being passed over said bar so as to mount said at least one lock plate on said bar; said first slider including a lock plate opening; said at least one lock plate being pivotally mounted within said lock plate opening of said first slider;
  (2) a bearing point on said first slider positioned to bear against said at least one lock plate in a position distal from the centerline of said bar; and
  (3) pivotal biasing means for pressing said at least one lock plate against said bearing point so that said at least one lock plate rotates slightly with respect to said bar, thereby locking said slot in said at least one lock plate to said bar and thereby locking said first slider to said bar.

2. A platform as recited in claim 1, wherein a portion of said at least one lock plate extends out beyond said first slider, so that said user can press said portion of said lock plate in order to rotate said at least one lock plate toward an orientation which is orthogonal to said centerline of said bar, thereby releasing said slot in said at least one lock plate from said bar and allowing said slider to slide along said bar.

3. A platform which a user can attach to a tree, comprising:
a. a frame, having a treeward-facing side;
b. a brace, located on said treeward-facing side of said frame, configured to bear against said tree;
c. a first slider, slidably attached to said frame;
d. locking means for locking said first slider to said frame;
e. a flexible tensile member, having a first end and a second end, wherein said first end is attached to said first slider and said second end is attached to said frame;
f. wherein said slidable attachment between said first slider and said frame comprises said first slider sliding along a bar attached to said frame;
g. wherein said locking means comprises unidirectional locking means, whereby said unidirectional locking means is configured to lock and hold said slider to said frame when a tensile load is applied to said slider such that said slider is free to slide along said bar in a direction away from said brace, but unable to travel along said bar in the opposite direction, unless said user releases said unidirectional locking means;
h. wherein said attachment between said first end of said tensile member and said first slider is removable, so that said tensile member can be looped around said tree before attaching said first end of said tensile member to said first slider; and
i. wherein said removable attachment between said first end of said tensile member and said first slider comprises:
  (1) a pin receiver in said first slider; and
  (2) a pin extending from said first end of said tensile member, wherein said pin is sized to slidably fit within said pin receiver.

4. A platform as recited in claim 3 wherein said first end of said tensile member further comprises a ring.

5. A platform as recited in claim 4, wherein:
a. said ring is a spring ring, configured to snap into an up position and a down position; and
b. wherein said first slider includes a boss positioned so that when said pin is placed within said pin receiver and said spring ring is snapped into said down position, a portion of said spring ring lies under said boss.

6. A platform as recited in claim 3, wherein:
a. said frame includes a guide channel proximate said first end of said bar, with said guide channel including a first end proximate said brace and a second end distal to said brace; and
b. said frame includes a lock member extending transversely across said first end of said guide channel, so that said first end of said guide channel and said lock member combine to form an access slot through which said tensile member can be laterally passed.

7. A platform as recited in claim 6, wherein:
a. said pin is removed from said pin receiver by pulling said pin upward; and
b. said lock member is positioned to bear down on the top of said tensile member when said tensile member is placed within said guide channel, thereby resisting said pin moving upward with respect to said pin receiver.

8. A platform which a user can attach to a tree, comprising:
a. a frame, having a treeward-facing side;
b. a brace, located on said treeward-facing side of said frame, configured to bear against said tree;
c. a first slider, slidably attached to said frame;
d. first locking means for locking said first slider to said frame;
e. a second slider, slidably attached to said frame;
f. second locking means for locking said second slider to said frame;
g. a flexible tensile member, having a first end and a second end, wherein said first end is attached to said first slider and said second end is attached to said second slider;
h. wherein said slidable attachment between said first slider and said frame comprises said first slider sliding along a first bar attached to said frame, and wherein said slidable attachment between said second slider and said frame comprises said second slider sliding along a second bar attached to said frame;
i. wherein said first locking means comprises a first unidirectional locking means, whereby said first unidirectional locking means is configured to lock and hold said first slider to said frame when a tensile load is applied to said first slider such that said first slider is free to slide along said first bar in a direction away from said brace, but unable to travel along said first bar in the opposite direction, unless said user releases said first unidirectional locking means; and
j. wherein said second locking means comprises a second unidirectional locking means, whereby said second unidirectional locking means is configured to lock and hold said second slider to said frame when a tensile load is applied to said second slider such that said second slider is free to slide along said second bar in a direction away from said brace, but unable to travel along said second bar in the opposite direction, unless said user releases said second unidirectional locking means; and k. wherein said first locking means comprises:
  (1) at least one lock plate;
  (2) said at least one lock plate including a slot sized to admit said first bar, wherein said slot is large enough to allow said at least one lock plate to rotate slightly with respect to said first bar;
  (3) said slot being passed over said first bar so as to mount said at least one lock plate on said first bar;
  (4) said first slider including a lock plate opening;
  (5) said at least one lock plate being pivotally mounted within said lock plate opening of said first slider;
  (6) a bearing point on said first slider positioned to bear against said at least one lock plate in a position distal from the centerline of said first bar; and
  (7) pivotal biasing means for pressing said at least one lock plate against said bearing point so that said at least one lock plate rotates slightly with respect to said first bar, thereby locking said slot in said at least one lock plate to said first bar and thereby locking said first slider to said first bar.

9. A platform as recited in claim 8, wherein said attachment between said first end of said tensile member and said first slider is removable, so that said tensile member can be looped around said tree before attaching said first end of said tensile member to said first slider.

10. A platform as recited in claim 8, wherein said second locking means comprises:
  a. at least one lock plate;
  b. said at least one lock plate including a slot sized to admit said second bar, wherein said slot is large enough to allow said at least one lock plate to rotate slightly with respect to said second bar;
  c. said slot being passed over said second bar so as to mount said at least one lock plate on said second bar;
  d. said second slider including a lock plate opening;
  e. said at least one lock plate being pivotally mounted within said lock plate opening of said second slider;
  f. a bearing point on said second slider positioned to bear against said at least one lock plate in a position distal from the centerline of said second bar; and
  g. pivotal biasing means for pressing said at least one lock plate against said bearing point so that said at least one lock plate rotates slightly with respect to said second bar, thereby locking said slot in said at least one lock plate to said second bar and thereby locking said second slider to said second bar.

11. A platform as recited in claim 8, wherein a portion of said at least one lock plate in said first slider extends out beyond said first slider, so that said user can press said portion of said lock plate in order to rotate said at least one lock plate toward an orientation which is orthogonal to said centerline of said first bar, thereby releasing said slot in said at least one lock plate from said first bar and allowing said first slider to slide along said first bar.

12. A platform as recited in claim 11, wherein a portion of said at least one lock plate in said second slider extends out beyond said second slider, so that said user can press said portion of said lock plate in order to rotate said at least one lock plate toward an orientation which is orthogonal to said centerline of said second bar, thereby releasing said slot in said at least one lock plate from said second bar and allowing said second slider to slide along said second bar.

13. A platform which a user can attach to a tree, comprising:
  a. a frame, having a treeward-facing side;
  b. a brace, located on said treeward-facing side of said frame, configured to bear against said tree;
  c. a first slider, slidably attached to said frame;
  d. first locking means for locking said first slider to said frame;
  e. a second slider, slidably attached to said frame;
  f. second locking means for locking said second slider to said frame;
  g. a flexible tensile member, having a first end and a second end, wherein said first end is attached to said first slider and said second end is attached to said second slider;
  h. said removable attachment between said first end of said tensile member and said first slider comprises a pin receiver in said first slider and a pin extending from said first end of said tensile member, wherein said pin is sized to slidably fit within said pin receiver;
  i. said frame includes a guide channel proximate said first end of said first bar, with said guide channel including a first end proximate said brace and a second end distal to said brace; and
  j. said frame includes a lock member extending transversely across said first end of said guide channel, so that said first end of said guide channel and said lock member combine to form an access slot through which said tensile member can be laterally passed.

14. A platform as recited in claim 13, wherein:
  a. said pin is removed from said pin receiver by pulling said pin upward; and
  b. said lock member is positioned to bear down on the top of said tensile member when said tensile member is placed within said guide channel, thereby resisting said pin moving upward with respect to said pin receiver.

15. A platform which a user can attach to a tree, comprising:
  a. a frame, having a treeward-facing side;
  b. a brace, located on said treeward-facing side of said frame, configured to bear against said tree;
  c. a first slider, slidably attached to said frame;
  d. locking means for locking said first slider to said frame;
  e. a flexible tensile member, having a first end and a second end, wherein said first end is attached to said first slider and said second end is attached to said frame;
  f. wherein said slidable attachment between said first slider and said frame comprises said first slider sliding along a bar attached to said frame;
  g. wherein said locking means comprises unidirectional locking means, whereby said unidirectional locking means is configured to lock and hold said slider to said frame when a tensile load is applied to said slider such that said slider is free to slide along said bar in a direction away from said brace, but unable to travel along said bar in the opposite direction, unless said user releases said unidirectional locking means; and
  h. wherein:
    (1) said bar opens into a plurality of through holes; and
    (2) said slider further comprises a supplemental lock having a safety pin which slides into one of said plurality of through holes.

* * * * *